(12) United States Patent
Weissman

(10) Patent No.: US 8,903,872 B1
(45) Date of Patent: Dec. 2, 2014

(54) NOSQL ONLINE ANALYTICAL PROCESSING ARCHITECTURE

(71) Applicant: Duetto Research, Inc., San Francisco, CA (US)

(72) Inventor: Craig Weissman, San Francisco, CA (US)

(73) Assignee: Duetto Research, Inc., San Francisco, CA (US)

( * ) Notice: Subject to any disclaimer, the term of this patent is extended or adjusted under 35 U.S.C. 154(b) by 0 days.

(21) Appl. No.: 14/030,677

(22) Filed: Sep. 18, 2013

Related U.S. Application Data

(60) Provisional application No. 61/820,856, filed on May 8, 2013.

(51) Int. Cl.
*G06F 17/30* (2006.01)
*G06Q 30/06* (2012.01)

(52) U.S. Cl.
CPC ................... *G06Q 30/0627* (2013.01)
USPC ............................................ 707/803; 705/5

(58) Field of Classification Search
USPC ............................................ 707/803; 705/5
See application file for complete search history.

(56) References Cited

U.S. PATENT DOCUMENTS

2014/0012882 A1* 1/2014 Poppitz ......................... 707/792
2014/0039943 A1* 2/2014 Ghindici et al. .................. 705/5

* cited by examiner

*Primary Examiner* — Amresh Singh
(74) *Attorney, Agent, or Firm* — Lowenstein Sandler LLP

(57) ABSTRACT

A breadth-first join module receives, at a runtime, a query for travel data, wherein the travel data is stored in a data store, the data store comprising parent and child data structures arranged in a hierarchy. The breadth-first join module identifies a first child data structure associated with the travel data, the first child data structure comprising a plurality of pointers, wherein each of the plurality of pointers is associated with one of a plurality of first level parent data structures in the data store and queries each of the plurality of first level parent data structures to resolve the plurality of pointers in the first child data structure, wherein the plurality of first level parent data structures comprise travel data objects associated with the plurality of pointers, and wherein at least one of the plurality of first level parent data structures comprises a pointer to a second level parent data structure. The breadth-first join module queries the second level parent data structure to resolve the pointer in the at least one first level parent data structure, wherein all of the plurality of pointers in the first child data structure are resolved prior to querying the second level parent data structure.

20 Claims, 12 Drawing Sheets

Booking Table 1052

| Booking ID | Property ID | Segment ID | Date ID | |
|---|---|---|---|---|
| 001 | 102 | 203 | 301 | |
| 002 | 103 | 201 | 302 | ... |
| 003 | 102 | 202 | 303 | |
| ⋮ | | | | |

Fig. 10A

Property Table 1054

| Property ID | Property | City ID | Country ID | |
|---|---|---|---|---|
| 101 | Hilton | 402 | 501 | |
| 102 | Marriott | 402 | 501 | ... |
| 103 | Westin | 403 | 502 | |
| ⋮ | | | | |

Fig. 10B

Segment Table 1056

| Segment ID | Segment | Yielding ID | |
|---|---|---|---|
| 201 | Expedia | 603 | |
| 202 | Priceline | 602 | ... |
| 203 | Group X | 601 | |
| ⋮ | | | |

Fig. 10C

Date Table 1058

| Date ID | Date | Month ID | Booking Date ID | Length of Stay ID |
|---|---|---|---|---|
| 301 | 7-01-2013 | 707 | 802 | 901 |
| 302 | 7-02-2013 | 707 | 801 | 902 |
| 303 | 7-03-2013 | 707 | 803 | 903 |
| ⋮ | | | | |

Fig. 10D

City Table 1060

| City ID | City | Country ID |
|---|---|---|
| 401 | Las Vegas | 501 |
| 402 | New York | 501 |
| 403 | London | 502 |
| ... | | |

Fig. 10E

Country Table 1062

| Country ID | Country |
|---|---|
| 501 | United States |
| 502 | Great Britian |
| 503 | Canada |
| ... | |

Fig. 10F

Join Table 1064

| Booking ID | Property | City | Country | Segment | Date | Month | Booking Date | Length of Stay |
|---|---|---|---|---|---|---|---|---|
| 001 | Marriott | New York | United States | Group X | 7-01-2013 | | | |
| 002 | Westin | London | Great Britian | Expedia | 7-02-2013 | | | |
| 003 | Marriott | New York | United States | Priceline | 7-03-2013 | | | |
| | | | | ... | | | ... | |

Fig. 10G

NOSQL ONLINE ANALYTICAL PROCESSING ARCHITECTURE

RELATED APPLICATIONS

This application is related to and claims the benefit of U.S. Provisional Application No. 61/820,856 filed on May 8, 2013, the entire contents of which is hereby incorporated by reference herein.

TECHNICAL FIELD

This disclosure relates to the field of data processing, and in particular to online analytical processing of data from a NoSql data store.

BACKGROUND OF THE INVENTION

The travel and hospitality industry in the United States and throughout the world is an ever increasing business sector. Advances in Internet and computing technology have significantly increased the opportunities to capture data from both travelers and travel properties (e.g., hotels, motels, bed and breakfasts, condominiums, houses). For example, web site based systems are used to offer the sale and rental of many travel properties and are used to make a large percentage of travel bookings. During these bookings, a significant amount of user travel data is received. The travel data may include, for example, a destination city, specific properties, dates of arrival, length of stay, room type, property amenities, price quotes, availability information, and/or other travel information. Property owners and managers are looking for chances to use this travel data to improve decisions relating to the management and sale of units in their travel properties. The mere availability of this data, however, does not by itself improve decisions that may lead to increased profits for the travel property. Conventional revenue management systems and booking engines are not equipped to make sufficient use of the newly acquired user travel data to deliver actionable insights and analysis as needed.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIGS. 10A-10G are block diagrams illustrating various data structures in a data store, according to an embodiment.

DETAILED DESCRIPTION OF THE PRESENT INVENTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for a NoSQL online analytical processing architecture. In one embodiment, a data store, such as a NoSQL database, is used to store travel data in a series of hierarchical data structures. The travel data can be used by a data analytics system to perform various analytic operations. In one embodiment, the data structures may be collections or tables including pointers that reference locations in collections tables of different levels in the hierarchy. For example, a child collection or table may include pointers or some other indication of a location in a first level parent collection or table where the value for a particular entry in the child collection or table may be found. A breadth-first join module may perform one or more breadth-first join operations in order to resolve the pointers within the hierarchy. In one embodiment, the breadth-first join module identifies all unique pointers within the child collection or table and resolves all of these unique pointers to first level parent collections or tables prior to querying any second level parent collections or tables to resolve pointers in the first level parent collections tables. This technique can minimize the number of data access operations to higher level data structures in the NoSQL database which can improve performance of the data analytics system. In one embodiment, collections are used in a NoSQL database, while tables are used in a relational database management system (RDBMS). For ease of explanation, the term "tables" is used in the following description and should be interpreted to mean a data structure in any system, including NoSQL, RDBMS, or other system.

Figure 1:
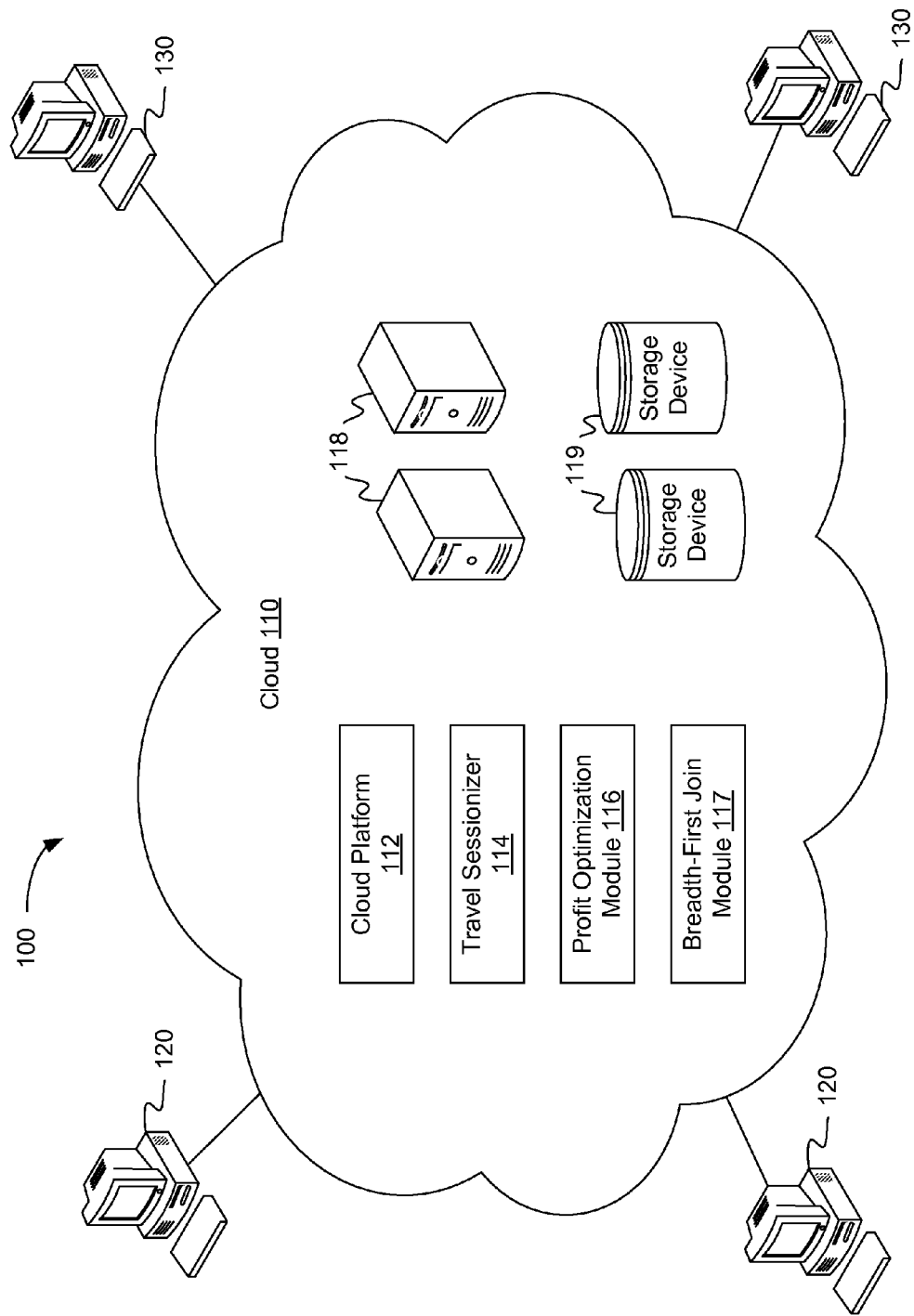
FIG. 1 is a block diagram illustrating a cloud computing environment for a multi-tenant cloud architecture, according to an embodiment.

FIG. 1 is a block diagram illustrating a cloud computing environment for a multi-tenant cloud architecture, according to an embodiment of the present invention. In one embodiment, cloud computing environment 100 includes cloud 110, one or more user devices 120, and one or more property devices 130. User devices 120 and property devices 130 may be used to access the resources of the cloud 110, and may include, for example, personal computers (PCs), workstations, laptop computers, tablet computers, mobile phones, personal digital assistants (PDAs) or the like. In one embodiment, user devices 120 may be personal computing devices used by individuals to shop for or browse travel properties (e.g., hotels, motels, bed and breakfasts, apartments, condominiums, houses). Property devices 130 may be computing devices used by property managers, owners, or employees to access demand forecasting, profit maximization or other resources available in cloud 110. Cloud 110 may include a group of networked computing resources accessible to the user devices 120 and property devices 130 over a network, such as a local area network (LAN), a wide area network (WAN), a global area network (GAN) such as the Internet, or a combination of such networks. The resources available in the cloud 110 may include, for example, processing devices, storage devices, applications, or other resources. The cloud 110 allows for a functional separation between the computing resources used, the user devices 120 where a user is working, and the property devices 130 where a property manager or owner is working. The cloud 110 may provide access to a vast network of computing resources and allow individuals to use data or resource intensive applications driven by cloud technology which may or may not be available locally given the limitations of the user devices 120 or the property devices 130.

In one embodiment cloud 110 includes cloud platform 112, travel sessionizer 114, profit optimization module 116, breadth-first join module 117, one or more application servers (or application server instances) 118, and one or more storage devices 119. Each of these resources may be located at the same location or at different locations, and may be connected to one another and/or to user devices 120 and property devices 130 through the network, as discussed above. Storage devices 119 may be, for example, memory, such as read-only memory (ROM), flash memory, random access memory (RAM), etc., or mass storage devices, such as a magnetic or optical storage devices, or a combination thereof. In one embodiment, one or more of storage devices 119 may include a NoSQL data store, such as a database. A NoSQL database can provide a mechanism for storage and retrieval of data that uses looser consistency models than traditional relational databases. Motivations for this approach include simplicity of design, horizontal scaling and finer control over availability. NoSQL databases are often highly optimized key-value stores intended for simple retrieval and appending operations, with the goal being significant performance benefits in terms of latency and throughput. NoSQL databases provide eventual consistency, where given a sufficiently long period of time over which no changes are sent, all updates can be expected to propagate eventually through the system. NoSQL databases, however, rarely allow join operations. Join operations are used combine fields from two different tables or other data structures in the database. In one embodiment, bread-first join module 117 can perform these join operations at the application tier. Certain NoSQL systems have transactions over single documents, other NoSQL systems are able to execute transactions over multiple documents, similar to what RDBMS systems support over multiple rows. In one embodiment, the NoSQL databases have a distributed, fault-tolerant architecture. The NoSQL database may employ a distributed architecture, with the data held in a redundant manner on several servers. In this way, the system can easily scale out by adding more servers, and failure of a server can be tolerated. This type of database typically scales horizontally and is used for managing large amounts of data, when the performance and real-time nature is more important than consistency (as in indexing a large number of documents, serving pages on high-traffic web sites, or delivering streaming media).

In one embodiment, user devices 120 and property devices 130 may interact directly with could platform 112. Cloud platform 112 may include software configured to provide access to the other resources in the cloud 110. Cloud platform 112 may cause the cloud resources, such as application servers 118 or storage devices 119, to appear, for example, as web pages or as virtual machines on user devices 120 or property devices 130.

Cloud platform 112 may pass messages between user devices 120 and property devices 130, and travel sessionizer 114 and profit optimization module 116. In one embodiment, travel sessionizer 114 captures raw event data from the travel shopping actions of users on user devices 120 and parses the raw event data into separate travel sessions. In one embodiment, a travel session includes the shopping, browsing, searching etc., done by one individual (or on one of user devices 120) for travel on a set of similar dates. For example, a travel session may include the searches performed by a user for travel over a certain weekend, or travel within several days of that weekend. The data associated with the search, including, for example, a destination city, specific properties, dates of arrival, length of stay, room type, property amenities, price quotes, availability information, and/or other travel information, may be included in a specific travel session associated with the user. Thus, the data in a give travel session is associated with a single trip. Travel sessionizer 114 may store this travel session data in the NoSQL database on one of storage devices 119 in cloud 110. If travel sessionizer 114 determines that the user makes additional searches for the same trip, travel sessionizer 114 may add any additional data to the same travel session. Additional details regarding travel sessionizer 114 will be provided below.

In one embodiment, profit optimization module 116 uses the travel session data identified by travel sessionizer 114 to forecast the demand at a given property on a certain date and determine a price for rooms at the property on that date that will increase or optimize the profit. Property managers, owners or employees using property devices 130 can access the findings of profit optimization module 116 and choose to implement the suggested prices in the sale of rooms at the property. Additional details regarding profit optimization module 116 will be provided below.

Breadth-first join module 117 performs join operations on the data in storage devices 119 (e.g. the NoSQL database) on behalf of profit optimization module 116. When performing operations (e.g., to forecast the demand at a given property, to display certain travel data in graphical form), profit optimization module 116 may request that breadth-first join module 117 perform the join operations. The join operation may combine, at the application tier, fields from two different tables or other data structures in storage devices 119 using values common to each. In one embodiment, a third table (e.g., a join table) may be created ephemerally where the combined fields are stored for later use. In one embodiment, the join table is created in the application tier and stored temporarily (e.g., in memory), since the NoSQL database may not support join operations directly. The data structures in the NoSQL database may be arranged in a hierarchy including one or more child tables (e.g., storing the lowest level of data, such as bookings data or travel session data) and multiple higher level parent tables. The child tables may include pointers to a first level parent table, which may in turn include a pointer to a second level parent table, and so on. In one embodiment, breadth-first join module 117 performs breadth-first joins by resolving each of the pointers in the child table prior to resolving any of the pointers in the first level parent table. The pointers in the tables of each level of the hierarchy are completely resolved prior to moving on to pointers in the tables of a higher level. In this way, breadth first join module 117 can resolve any matching pointers at once, which reduces the number of access operations performed on the NoSQL database in storage devices 119. Additional details regarding breadth-first join module 117 will be provided below.

Figure 2:
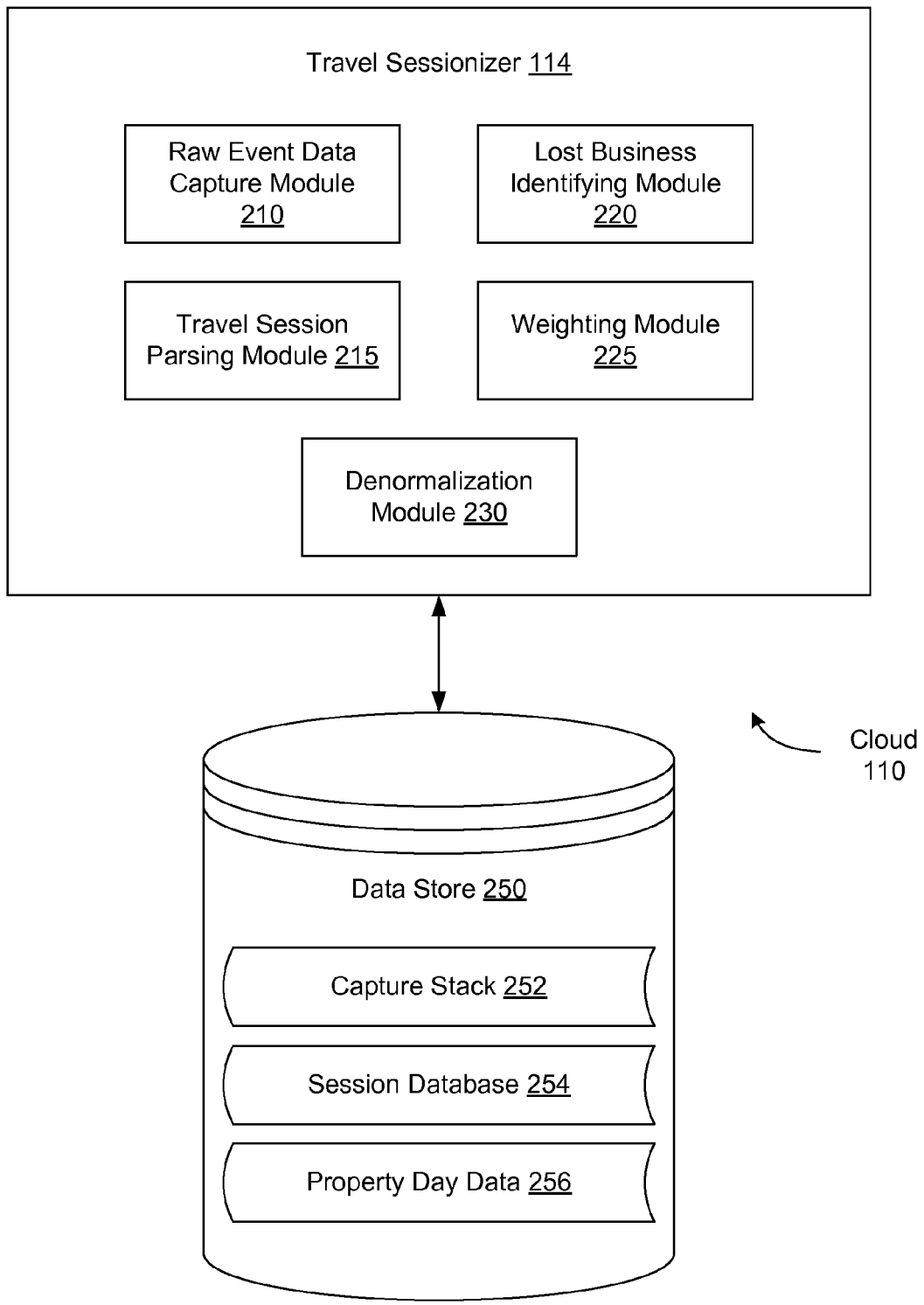
FIG. 2 is a block diagram illustrating a travel sessionizer, according to an embodiment.

FIG. 2 is a block diagram illustrating a travel sessionizer, according to an embodiment of the present invention. In one embodiment, travel sessionizer 114 may be implemented by one of application servers 118 in cloud 110, as shown in FIG. 1. In one embodiment, travel sessionizer 114 includes raw event data capture module 210, travel session parsing module 215, lost business identifying module 220, weighting module 225, and denormalization module 230. In one embodiment, travel sessionizer 114 is connected to a data store 250, which may be a file system, database or other data management layer resident on a data storage device, such as one of storage devices 119, and may include a disk drive, RAM, ROM, database, etc.

In one embodiment, raw event data capture module 210 captures raw event data from users who are shopping, browsing, searching, etc. for travel on one of user machines 120. In one embodiment, a user may search for a property using a travel website running in a web browser. The web browser may use cookies or some other tracking mechanism to capture the raw event data. The raw event data may include an indication of the criteria that the user puts into each travel search. For example, the raw event data may include a destination city, specific properties, dates of arrival, length of stay, room type, property amenities, price quotes, availability information, and/or other travel information. The web browser may transmit these cookies to travel sessionizer 114 where they are received by raw event data capture module 210. In one embodiment, raw event data capture module 210 stores the raw event data in a capture stack 252 in data store 250.

In one embodiment, travel session parsing module 215 parses the raw event data in capture stack 252 into individual travel sessions. In one embodiment, a travel session includes the shopping, browsing, searching, etc., done by one individual (or on one of user devices 120) for travel on a set of similar dates. For example, travel session parsing module 215 may associate all searches done from a single user device 120, with one individual. The user device 120 may be identified, for example, using a fingerprinting technique to identify a unique combination of Internet Protocol (IP) address, browser type, and/or other features associated with an individual. In another embodiment, travel session parsing module 215 may identify an individual using cookies (either first party cookies from a particular travel website, or third party cookies shared across multiple websites), or using login information (e.g., a unique identifier and password combination). The date component of the travel session may be based upon the dates for which the user is searching for travel information. For example, all searches done by the user for the same dates may be considered part of the same travel session. In one embodiment, searches done for dates that are in close proximity, but not exactly the same, may also be included in the same travel session. For example, travel session parsing module 215 may be configured with a threshold (e.g., +/−2 days) for the start and end of a trip. If the user searches for travel on dates that falls within the threshold, travel session parsing module 215 may consider that search to be part of the same travel session. In one embodiment, travel session parsing module 215 stores the travel data corresponding to each travel session in session database 254 of data store 250.

In one embodiment, lost business identifying module 220 identifies instances of lost business from the data in session database 254. Lost business may include, for example, regrets and denials. A regret occurs when an individual is offered a property on a given night for a certain price, but for some reason does not actually book the property. A denial occurs when the individual expresses an interest in booking a property of the given night, but is unable to do so, because, for example, the property is sold out or the requested room type is unavailable. Lost business identifying module 220 can analyze the shopping behaviors of an individual to determine when regrets and denials occur. Lost business identifying module 220 may add an indication of a regret or denial for a particular property to the corresponding entry in session database 254 in response to this determination.

Weighting module 225 may make a determination of the strength of a regret or denial and may assign a corresponding weighting value. For example, each of regrets and denials may be divided into different tiers, where each tier has a different weighting value. In one embodiment, with respect to denials, a first tier with a lower weighting value may include a property that was not included in a list of properties displayed to a user. A second tier, with a higher weighting value, may include a property that was specifically searched for by a user, but was sold out, and the user does not book another property on the same or similar dates. A third tier, with a highest weighting value indicating a strongest denial, may include a property thaws was specifically searched for by a user, but was sold out, and the user goes on to book another property on the same or similar dates. Weighting module 225 may add the weighting value for the regret or denial to the corresponding entry in session database 254.

In one embodiment, denormalization module 230 denormalizes the data in session database 254 to determine the number of regrets and denials for a given property on a certain day. Denormalization module 230 may read each entry in session database 254 to determine if there are any regrets or denials indicated. For each regret or denial, denormalization module 230 may increment a count value for an entry in property day data 256. In property day data 256, there may be a separate entry for each day at each property. The values in each entry represent the number of regrets and denials determined for the associated day at the associated property. In one embodiment, the number of regrets and denials are combined into a single count value. In other embodiments, however, each entry in property day data 256 may have a separate count value for each of regrets and denials.

Figure 3:
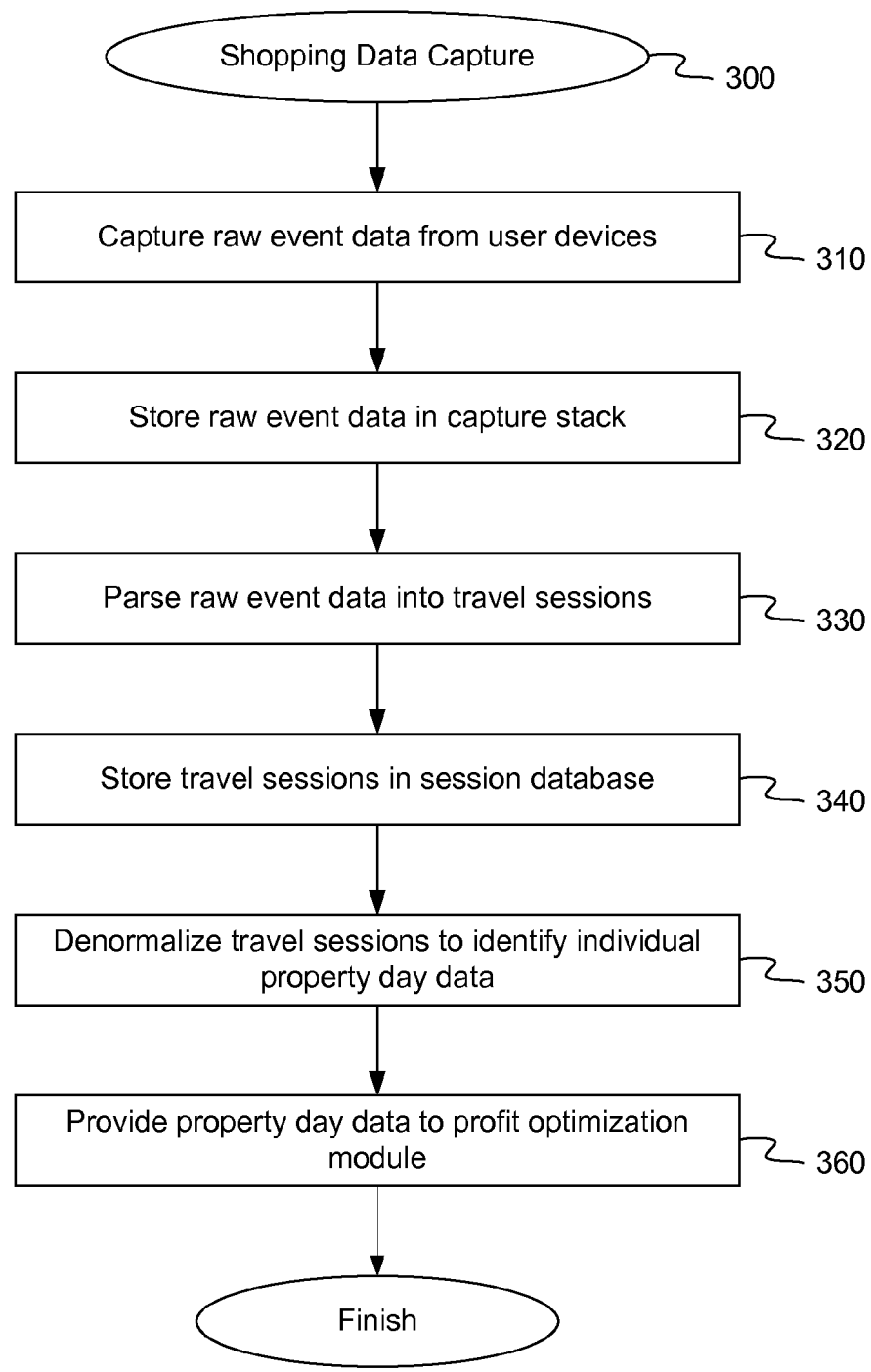
FIG. 3 is a flow diagram illustrating a shopping data capture method, according to an embodiment.

FIG. 3 is a flow diagram illustrating a shopping data capture method, according to an embodiment of the present invention. The method 300 may be performed by processing logic that comprises hardware (e.g., circuitry, dedicated logic, programmable logic, microcode, etc.), software (e.g., instructions run on a processor to perform hardware simulation), or a combination thereof. The processing logic is configured to capture travel shopping data from individual users. In one embodiment, method 300 may be performed by travel sessionizer 114, as shown in FIGS. 1 and 2.

Referring to FIG. 3, at block 310, method 300 captures raw event data from user devices. In one embodiment, raw event data capture module 210 captures raw event data from users who are shopping, browsing, searching, etc. for travel on one of user machines 120. If a user is searching for a property using a travel website running in a web browser, the web browser may use cookies or some other tracking mechanism to capture the raw event data. The raw event data may include an indication of the criteria that the user puts into each travel search. For example, the raw event data may include a destination city, specific properties, date of arrival, length of stay, room type, property amenities, price quotes, availability information, and/or other travel information. The web browser may transmit these cookies to travel sessionizer 114 where they are received by raw event data capture module 210. At block 320, method 300 stores the raw event data in a capture stack 252 in data store 250.

At block 330, method 300 parses the raw event data into separate travel sessions. In one embodiment, travel session parsing module 215 parses the raw event data in capture stack 252 into individual travel sessions. In one embodiment, a travel session includes the shopping, browsing, searching etc., done by one individual (or on one of user devices 120) for travel on a set of similar dates. For example, travel session parsing module 215 may associate all searches done from a single user device 120, with one individual. The data component of the travel session may be based upon the dates for which the user is searching for travel information. At block 340, method 300 stores the travel data corresponding to each travel session in session database 254 of data store 250.

At block 350, method 300 denormalizes the travel session data to identify individual property day data. In one embodiment, denormalization module 230 denormalizes the data in session database 254 to determine the number of regrets and denials for a given property on a certain day. Denormalization module 230 may read each entry in session database 254 to determine if there are any regrets or denials indicated. For each regret or denial, denormalization module 230 may increment a count value for an entry in property day data 256. In property day data 256, there may be a separate entry for each day at each property. The values in each entry represent the number of regrets and denials determined for the associated day at the associated property. At block 360, method 300 provides the property day data 256 to profit optimization module 116, or to another application running on one of application servers 118 or elsewhere, for additional processing.

Figure 4:
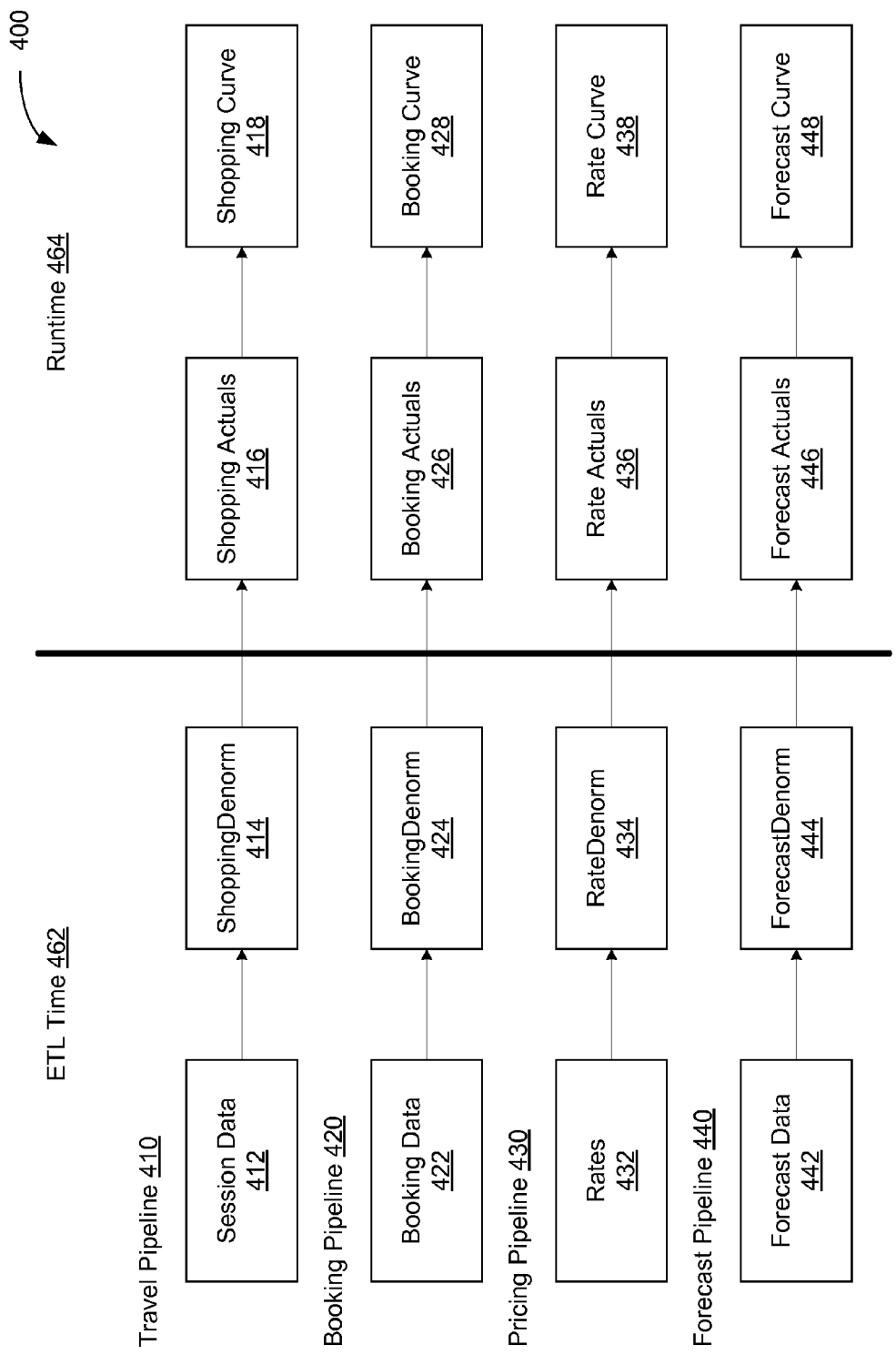
FIG. 4 is a block diagram illustrating data collection pipelines for travel sessionization, according to an embodiment.

FIG. 4 is a block diagram illustrating data collection pipelines for travel sessionization, according to an embodiment of the present invention. The various modules and components may be described in regards to their roles in collecting and analyzing data with respect to travel sessions, property bookings and prices, as well as demand or other forecasts.

In one embodiment, the processing flow 400 includes travel pipeline 410, booking pipeline 420, pricing pipeline 430, and forecast pipeline 440. In one embodiment, data in each of pipelines 410, 420, 430 and 440, as well as any other pipelines (not shown), may be processed using the same or similar sets of processing logic, instructions and algorithms. For example, other data pipelines including related travel data, such as the number and timing of cancellations for a given property, may also be similarly processed. Having the same or similar processing logic for each pipeline may simplify the operations of travel sessionizer 114, potentially saving time and/or computing resources. In one embodiment, the system not only denormalizes any source system travel event by stay date, but also stores any changes to those stay dates based on when those changes occurred (e.g., the booking or modification date).

In one embodiment, travel pipeline 410 includes session data 412, shoppingDenorm data 414, shopping actuals 416 and shopping curve 418. Travel pipeline 410, as well as all other pipelines, is also divided into two timeframes. In one embodiment, the processing of session data 412 and shoppingDenorm data 414 is performed at extract, transform, load time (ETL time) 462. ETL time 462 is the time when data is extracted from outside sources (e.g., user devices 120), transformed to fit operational needs (e.g., from raw data to session data), and loaded into the target database (e.g., shoppingDenorm data 414 in data store 250). In one embodiment, the processing of shopping actuals 416 and shopping curve 418 is performed at runtime 464. Runtime 464 is the time when a user of property device 130 interacts with travel sessionizer 114 or profit optimization module 116, or a time when a scheduled task is automatically performed. In other embodiments, the processing of data in travel pipeline 410 may occur at other times. For example, shoppingDenorm data 414 may be processed at runtime 464 or shopping actuals 416 may be processed at ETL time 462 or at some other time.

In one embodiment, travel pipeline 410 begins with session data 412. Session data 412 may be data pulled from session database 254 of data store 250. As described above, travel session parsing module 215 parses the raw event data in capture stack 252 into individual travel sessions. In one embodiment, a travel session includes the shopping, browsing, searching, etc., done by one individual (or on one of user devices 120) for travel on a set of similar dates. For example, travel session parsing module 215 may associate all searches done from a single user device 120, with one individual. The date component of the travel session may be based upon the dates for which the user is searching for travel information. For example, all searches done by the user for the same dates may be considered part of the same travel session. In one embodiment, searches done for dates that are in close proximity, but not exactly the same, may also be included in the same travel session. For example, travel session parsing module 215 may be configured with a threshold (e.g., +/−2 days) for the start and end of a trip. If the user searches for travel on dates that fall within the threshold, travel session parsing module 215 may consider that search to be part of the same travel session. In one embodiment, session data 412 may include multiple sessions, and each session may include data pertaining to multiple properties and/or across multiple days (e.g., the length of the trip searched for by the session user).

In one embodiment, session data 412 is followed by shoppingDenorm data 414. ShoppingDenorm data 414 may correspond to property day data 256 of data store 250. In one embodiment, denormalization module 230 denormalizes the session data 412 to organize the data, including regrets and denials, by a given property on a certain day. Denormalization module 230 may read each entry in session data 412 to determine if there are any regrets or denials indicated. For each regret or denial, denormalization module 230 may increment a count value for an entry in shoppingDenorm data 414. ShoppingDenorm data 414 may include a separate entry for each day at each property. The values in each entry represent the number of regrets and denials determined for the associated day at the associated property. Thus, shoppingDenorm data 414 is a rotated view of the same data present in session data 412, but organized by property day (i.e., a certain day at the given property) rather than by travel session (i.e., user and date range).

In one embodiment, shopping actuals 416 include known data points about each future date represented in shoppingDenorm data 414. For example, shopping actuals 416 may include the number of users who searched for travel on a given day in the future. This number may be further broken down by other categories (such as property type, location, rating, segment, etc.). The resulting shopping actuals 416 thus illustrate how many people were shopping, on a given day in the past, for travel on a given day in the future. For example, if the day of travel is November 12, the shopping actuals 416 can show the number of users who searched for travel on November 12 on the days leading up to November 12 (e.g., October 25, October 26, October 27, etc.) up until "today," (i.e., the day the processing is performed). Since shopping actuals 416 only include "actual" measured data, the actuals 416 may be limited to past days (e.g., prior to and/or including "today"). In one embodiment, the data for shopping actuals 416 may be stored in a numerical or text format. This data may be displayed to a user, upon request, in an easy to read bar or line graph, indicating the change over time.

In one embodiment, shopping curve 418 includes a forecast or prediction for future days. Shopping curve 418 may include the actual data up until "today" from shopping actuals 416, plus the forecasted demand determined by profit optimization module 116. Details of how profit optimization module 116 predicts demand, as well as other data points, are provided below. Thus, if "today" is October 30, shopping curve 418 may include the forecasted demand for travel on November 12 that will be experienced on October 31, November 1, November 2, etc., up until November 12. The data for shopping curve 418 may also be stored in a numerical or text format. This data may be similarly displayed to a user, upon request, in an easy to read bar or line graph, either with or without the data from shopping actuals 416.

As discussed above, similar processing logic, instructions and algorithms may be used for each of the remaining pipelines 420, 430 and 440. Each pipeline, however, includes different data. In one embodiment, booking pipeline 420 begins with booking data 422. The booking data 422 may be obtained, for example, from a reservations engine or a property management system (PMS) running either in cloud 110 or on one of property devices 130. The booking data 422 may include actual bookings or reservations made by a user. The booking data 422 may be rotated (e.g., by denormalization module 230) to form bookingDenorm data 424, which is organized by bookings for a given property on a certain day. Booking actuals 426 and booking curve 428 may include the actual bookings and predicted bookings, respectively, for a given day.

In one embodiment, pricing pipeline 430 begins with rate data 432. Rate data 432 may include the rates offered for a property for future days, as of a specific day (e.g., "today" or some day in the past). The rate data 432 may be obtained, for example, from the reservations engine or PMS running either in cloud 110 or on one of property devices 130. The rate data 432 may be rotated (e.g., by denormalization module 230) to form rateDenorm data 434, which is organized by day and includes the rates offered for that day by a certain property on days in the past leading up to the day of arrival. Rate actuals 436 and rate curve 438 may include the actual rates and predicted rates, respectively, for a given day at the property.

Another feature of the logic and algorithms used to process data is that they may also be used to process forecasts made by profit optimization module 116. In one embodiment, forecast pipeline 440 may begin with forecast data 442. Forecast data 442 may include the forecasted demand, bookings, prices, etc. for a property for future days, as of a specific day (e.g., "today" or some day in the past). The forecast data 442 may be obtained, for example, from profit optimization module 116, as will be described further below. The forecast data 442 may be rotated (e.g., by denormalization module 230) to form forecastDenorm data 444, which is organized by day and includes the forecasts for that day for a certain property on days in the past leading up to the day of arrival. Forecast actuals 446 and forecast curve 448 may include the actual forecasts and predicted future forecasts, respectively, for a given day at the property.

As described above, generally the actuals include actual data from days in the past and/or including data from "today" (i.e., the day the processing is performed). However, the concept of "today" may be more flexible in certain embodiments. For example, a user of property machine 130 may request to view the forecast actuals 446 and curve 448 with respect to some other date. For example, a day (e.g., September 18) from the previous month may be set as "today." As a result, the forecast actuals 446 would include that actual forecasts for the days up to and including September 18 and the forecast curve 448 would begin on September 19 and proceed into the future. This flexible concept of "today" may be similarly applied in other processing pipelines.

Figure 5:
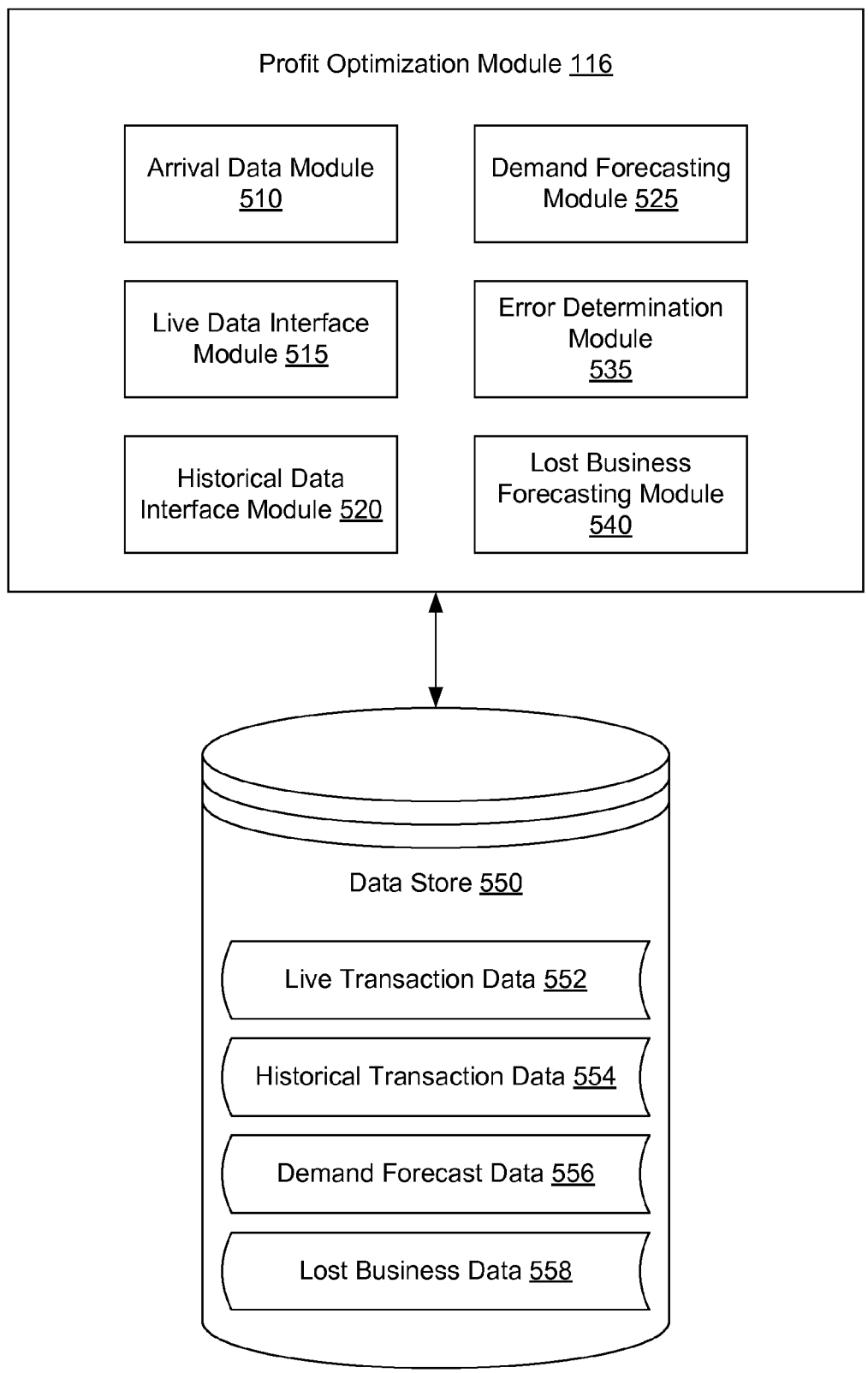
FIG. 5 is a block diagram illustrating a profit optimization module, according to an embodiment.

FIG. 5 is a block diagram of one embodiment of a profit optimization module 116 that is included in cloud 110 of FIG. 1. In one embodiment, profit optimization module 116 may include arrival data module 510, live data interface module 515, historical data interface module 520, demand forecasting module 525, error determination module 535 and lost business forecasting module 540. In one embodiment, profit optimization module 116 is connected to a data store 550, which may be a file system, database or other data management layer resident on a data storage device, such as one of storage devices 119, and may include a disk drive, RAM, ROM, database, etc. Data store 550 may include, for example, live transaction data 552, historical transaction data 554, demand forecast data 556, lost business data 558 and/or other information.

Figure 6:
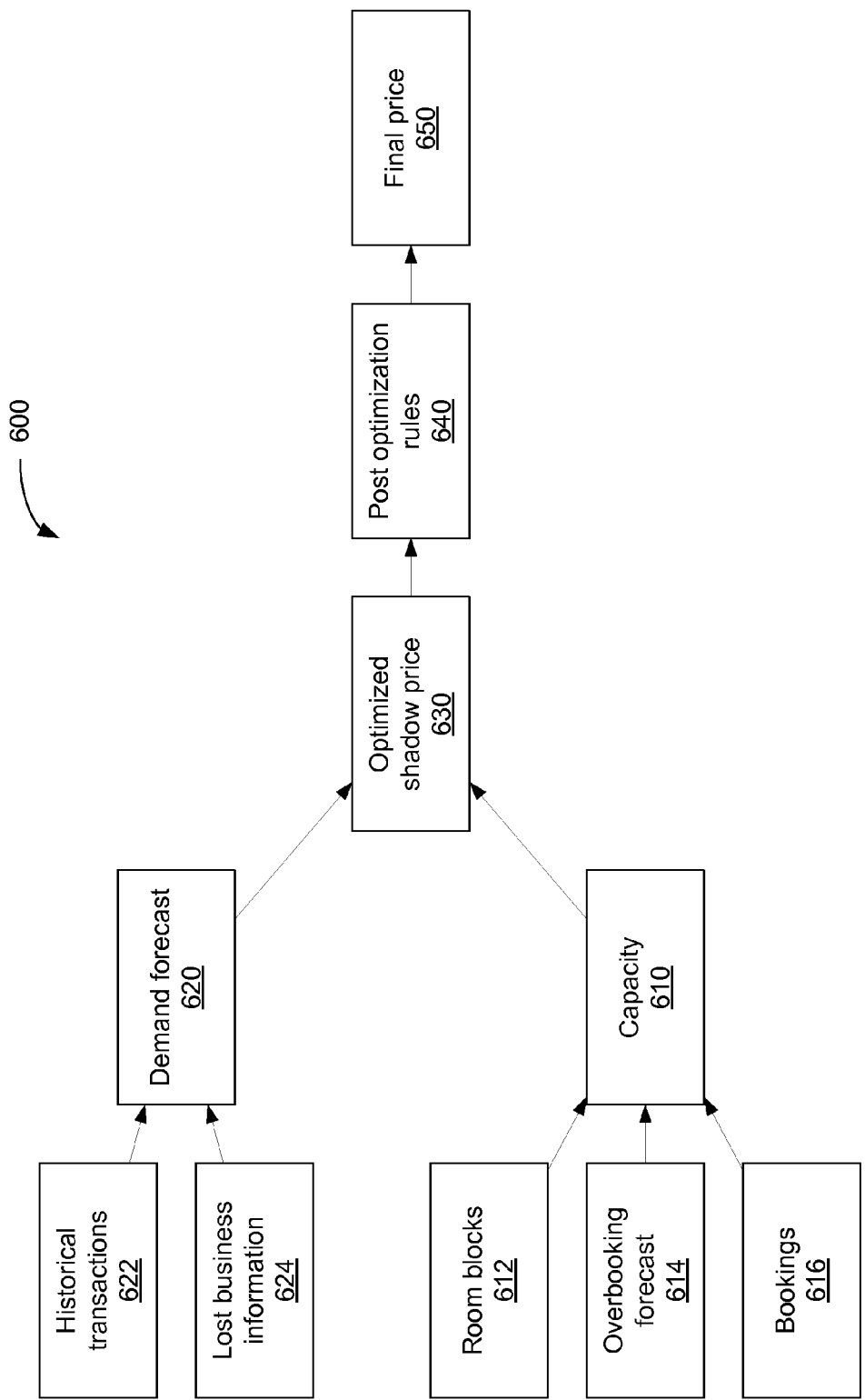
FIG. 6 is a block diagram illustrating a profit optimization processing flow, according to an embodiment.

FIG. 6 is a block diagram illustrating a profit optimization processing flow, according to an embodiment of the present invention. The various modules and components may be described in regards to their roles in determining a price for one unit of lodging (e.g., a hotel room) that will optimize the profit for the owner of the property.

In one embodiment, the processing flow 600 begins with determining a capacity for the property on a given day at block 610. In one embodiment, for ease of explanation, the day for which the capacity is determined may be referred to as the "day of arrival" or the "arrival day," although it should be understood that a guest need not necessarily arrive at the property on that day, but rather just make a reservation for that day/night. For example, the guest may have checked-in to the property on an earlier day, but their stay includes the "day of arrival." The capacity may take into account several factors including, among others, the physical number of rooms in the property, room blocks 612, an overbooking forecast 614, and previous bookings 616. Room blocks 612 may include blocks of rooms (or other lodging units) that are being held or reserved for a specific guest or group, but have not been officially booked. For example, commonly a block of rooms may be reserved for guests of a wedding or attendees of a conference, while the individuals may actually book the rooms themselves at a later date. The overbooking forecast 614 may designate a number of rooms or a percentage of rooms of the actual physical capacity of the hotel that may be booked to account for cancellations and no-shows. In one embodiment, there is a default number of rooms (e.g. 5) or a percentage of the total rooms in the property (e.g., 5%) that may be overbooked. In another embodiment, the overbooking forecast 614 may include an estimate of how many rooms to overbook based on historical trends for cancellations and no-shows. Previous bookings 616 may a number of rooms that were previously booked by guests for the day of arrival. These bookings may be subtracted from the physical capacity of the property in order to determine the capacity 610 for the property on the day of arrival. In one embodiment, room blocks 612, the overbooking forecast 614 and previous bookings 616 are obtained from a booking engine or central reservation system associated with the property.

At block 620, the demand for lodging units is forecasted for the day of arrival. In one embodiment, historical transactions 622 and lost business information 624 are combined to determine the demand forecast 620. Historical transactions 622 may include the number of bookings made at the property in the past. In one embodiment, trends may develop over time for the same day of the week. Thus, historical transactions 622 may include, for example, the number of bookings made for the same day of the week as the day of arrival during some number of previous weeks. In another embodiment, historical transactions 622 may include the number of bookings made within some period of time (e.g., 5 days) of the day of arrival during some number of previous weeks. In other embodiments, some other historical transaction data may be used. Lost business information 624 may include regrets and denials that did not result in an actual booking for the property. Regrets are generated when a potential customer searches for or inquires about a room at the property but does not ultimately book the room. Denials are generated when a potential customer is unable to book a room because either the property or the specific room type that they are searching for is sold out or otherwise unavailable on the day of arrival. This lost business information 624 can be informative of the interest in the property on the day in question and may affect the demand forecast 620. In one embodiment, historical transaction data 622 may be obtained from the booking engine or central reservation system associated with the property, and lost business information 624 may be obtained from travel sessionizer 114, as described above. Additional details of the demand forecast 620 will be described below.

The capacity 610 and the demand forecast 620 are combined to generate the optimized shadow price 630. In one embodiment, the shadow price represents the highest price that a property can charge for an extra room at the property (and have the room be booked) based on the forecasted demand 620. For example, if the offer price for a room at the property is above the shadow price, it is unlikely that a booking will result, because the demand forecast 620 cannot support that price. If the offer price is below the shadow price, the room will likely be booked, but the property could likely have gotten a higher price for the room. If the offer price is equal to the shadow price, the property can likely optimize its profit, by obtaining a booking at the highest possible price for the extra room. In one embodiment, the shadow price is determined based on prices charged in historical transactions 622 and adjusted based on the forecasted demand. For example, if the forecasted demand is higher than the actual demand was at a certain time in the past, the shadow price may be increased from what the actual offer price was at that time in the past.

After the optimized shadow price 630 is determined, additional post optimization rules 640 may be enforced. Post optimization rules 640 can be used to vary the final price 650 from the optimized shadow price 630 according to preferences of the property owner/manager. Post optimization rules 640 may have default settings or alternatively may be controlled by the property owner/manager or by any user of the profit optimization engine. In one embodiment, price elasticity and the propensity of customers to pay a certain price, can be determined from the lost business data 624. This information can be incorporated in the post optimization rules 640 to modify the optimized shadow price 630. For example, if the shadow price 630 for the day of arrival is $100, but it is determined that customers in a specific segment are price insensitive for that day (e.g., if they are coming on business and they are on an expense account), the final price 650 can be adjusted above $100. If by looking at the data, it is determined that the customers in a segment are indifferent to paying $109 or $139 for a room (this may be seen in the data aggregated for a market), then a post optimization rule 640 for that day can modify the original $100 shadow price 630 into a $139 final selling price 650 for that segment.

In another embodiment, the post optimization rules 640 can also be based on marketing or management decisions. For example, the manager of a property may want rooms at his hotel to be priced on a specific channel at least $10 above a competing property. A post optimization rule 640 may be set to increase the final price 650 to $10 above the competitor's price for the day of arrival. Other post optimization rules 640 can deal with minimum selling rate by day of week and/or season or a maximum selling rate (e.g., the marketing department always wants to make sure the price 650 never goes below a given price or above another price). The final price 650, as modified by the post optimization rules 640 may be displayed to customers in a given segment for the day of arrival.

Figure 7:
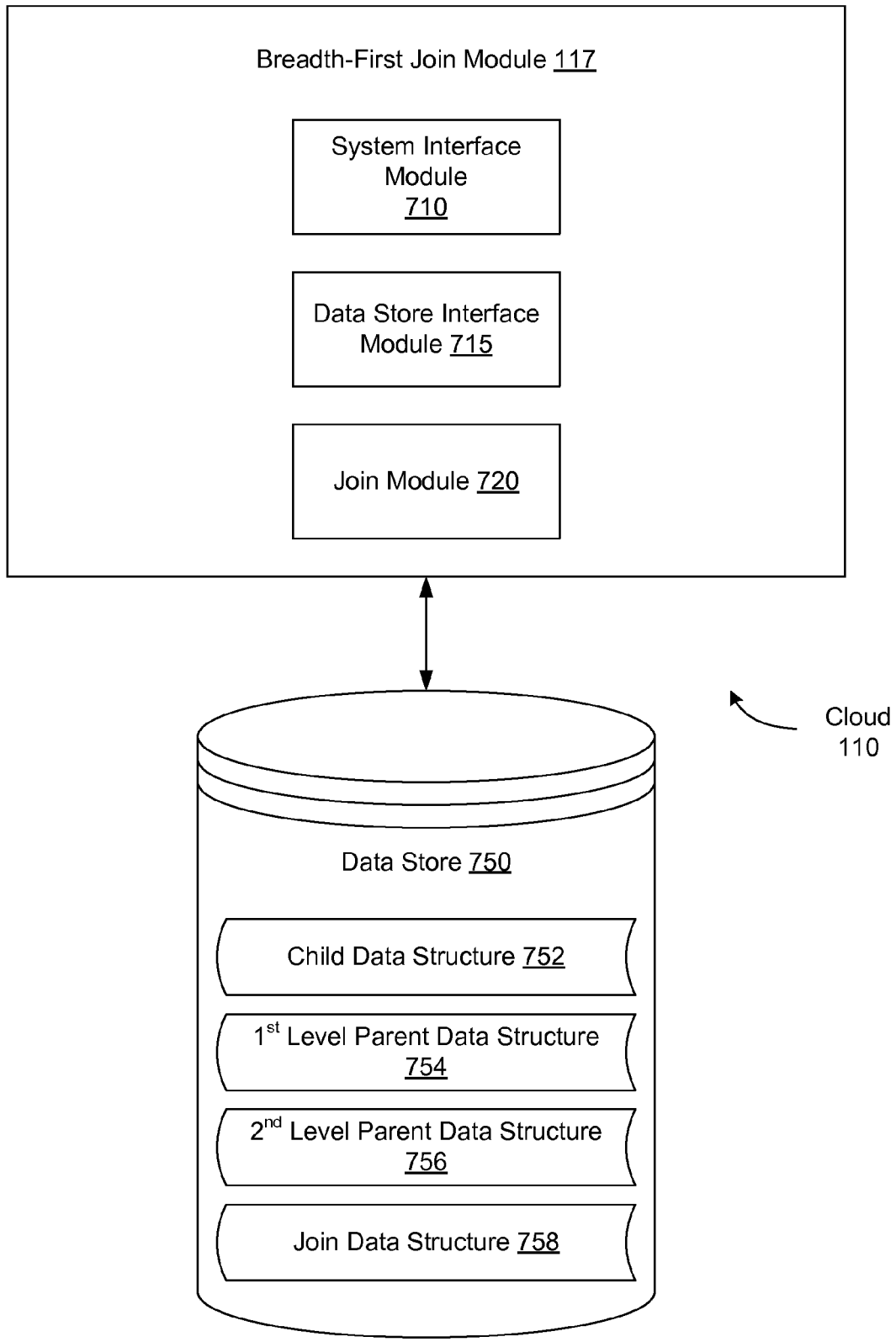
FIG. 7 is a block diagram illustrating a breadth-first join module, according to an embodiment.

FIG. 7 is a block diagram illustrating a breadth-first join module, according to an embodiment of the present invention. In one embodiment, breadth-first join module 117 may be implemented by one of application servers 118 in cloud 110, as shown in FIG. 1. In one embodiment, breadth-first join module 117 includes system interface module 710, data store interface module 715 and join module 720. In one embodiment, breadth-first join module 117 is connected to a data store 750, which may be a file system, database or other data management layer resident on a data storage device, such as one of storage devices 119, and may include a disk drive, RAM, ROM, database, etc. In one embodiment, data store 750 may be a NoSQL database.

In one embodiment, system interface module 710 interacts with other modules in cloud 110, such as travel sessionizer 114 or profit optimization module 116, to process data management requests. For example, in one embodiment, when performing an operation, such as forecasting a demand, profit optimization module 116 may access historical transaction data 722 or bookings data 716, which may be stored in the NoSQL database. This data, however, may be in a format that is not appropriate for the particular needs of profit optimization module 116. As discussed above, the data may be arranged in a hierarchical data structure including one or more child data structures 752, one or more first level parent data structures 754, one or more second level data structures 756, and possibly any additional higher level data structures. In order to obtain usable data from different levels of these multiple data structures, profit optimization module 116 may issue a request to breadth-first join module 117 to perform a join operation. System interface module 710 may receive this request from profit optimization module 116, or from some other module in the system, and forward the request to data store interface module 715.

Data store interface module 715 interacts with the data structures in the NoSQL database to query the database and retrieve the data from the tables at different levels in the hierarchy. For example, in one embodiment, data store interface module 715 may identify a child data structure 752 and identify all unique pointers in the child data structure 752. The pointers may point to locations in higher level data structures, such as first level parent data structure 754. Data store interface module 715 may query first level parent data structure 754 to resolve the pointers in child data structure 752. In one embodiment, resolving a pointer includes retrieving the value of an associated travel data object (i.e., the travel data object in the first level parent data structure 754 to which the pointer in child data structure 752 points). Join module 720 may create and populate a join data structure 758 with the retrieved value. The resulting join data structure 758 includes all relevant data without having to rely on (e.g., point to) any other data structures in data store 750. In one embodiment, join data structure 758 may be created at the application tier and stored ephemerally for use by other applications, such as profit optimization module 116 or other modules. For example, in one embodiment, join data structure 758 may be stored in a memory (e.g., a random access memory available to breadth-first join module 117), rather than in data store 750. In one embodiment, breadth-first join module 117 performs breadth-first joins by resolving each of the pointers in the child data structure 752 prior to resolving any of the pointers in the first level parent data structure 754. The pointers in the tables of each level of the hierarchy are completely resolved prior to moving on to pointers in the tables of a higher level. In this way, breadth first join module 117 can resolve any matching pointers at once, which reduces the number of access operations performed on the NoSQL database in data store 750.

Figure 8:
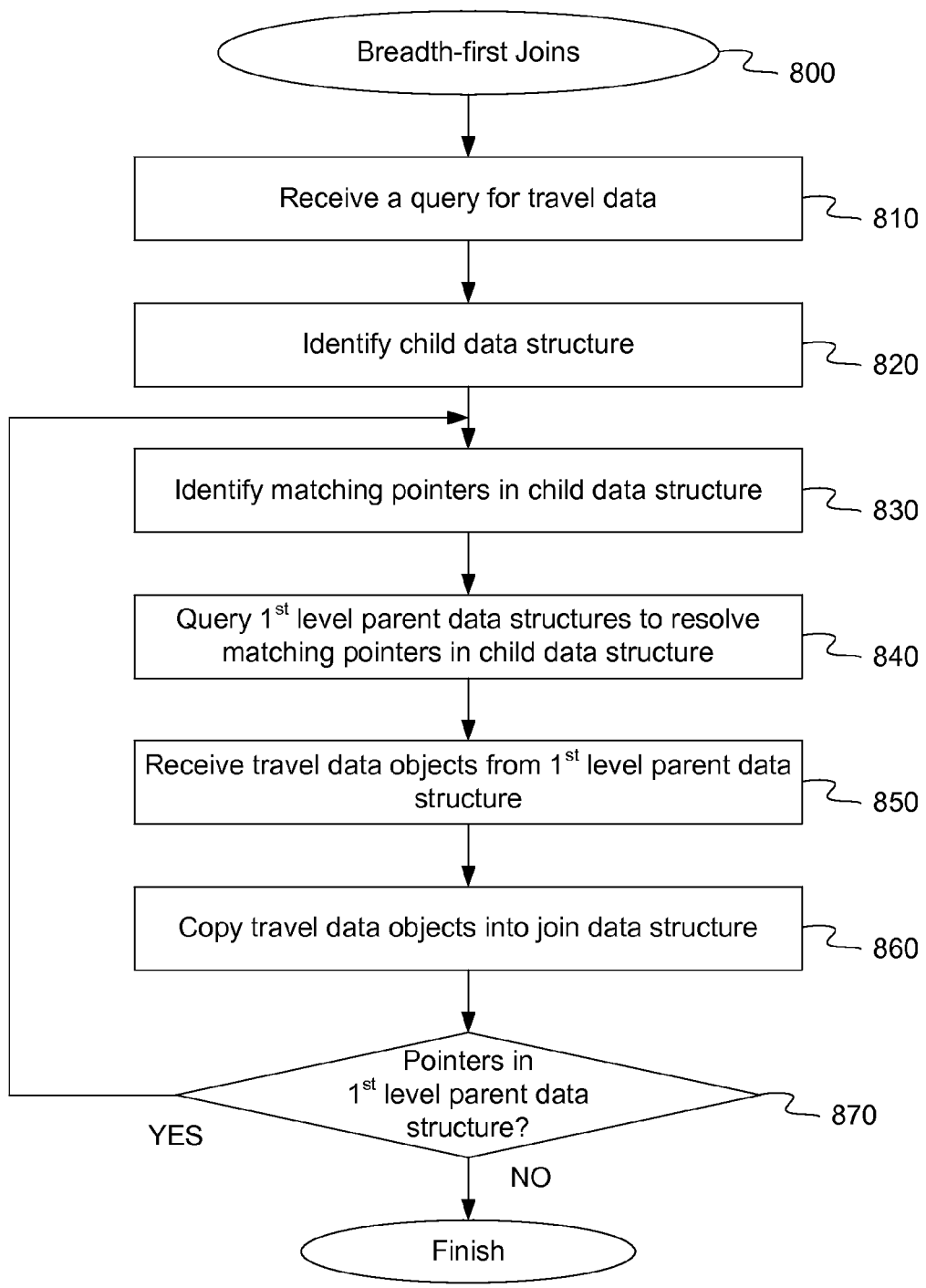
FIG. 8 is a flow diagram illustrating a method for breadth-first joins, according to an embodiment.

FIG. 8 is a flow diagram illustrating a method for breadth-first joins, according to an embodiment of the present invention. The method 800 may be performed by processing logic that comprises hardware (e.g., circuitry, dedicated logic, programmable logic, microcode, etc.), software (e.g., instructions run on a processor to perform hardware simulation), or a combination thereof. The processing logic is configured to join data from data structures in multiple levels of a hierarchical database using a breadth-first algorithm. In one embodiment, method 800 may be performed by breadth-first join module 117, as shown in FIGS. 1 and 7.

Referring to FIG. 8, at block 810, method 800 receives a query for travel data. In one embodiment, when performing an operation, such as forecasting a demand at a property or generating a graph to present historical booking data, profit optimization module 116 may access the travel data stored in the NoSQL database. In order to obtain usable data from the different levels of the data structure, profit optimization module 116 may issue a request to breadth-first join module 117 to perform a join operation. System interface module 710 may receive this request from profit optimization module 116, or from some other module in the system, and forward the request to data store interface module 715.

At block 820, method 800 identifies a child data structure 752. The child data structure 752 may be the lowest level data structure in the NoSQL hierarchy, which contains the most detailed travel data objects. FIG. 10A illustrates a booking table 1052, which may be one example of a child data structure 752. In one embodiment, the booking table 1052 includes a number of entries, each identified by a booking identifier value (e.g., 001, 002, 003). Each entry has a number of fields associated with relevant booking data (e.g., property, segment, date). The child table may also be referred to as a fact table. Each field in booking table 1052 includes a pointer (also referred to as a foreign key) to a location in a first level parent data structure, such as property table 1054 shown in FIG. 10B, segment table 1056 shown in FIG. 10C, or date table 1058 shown in FIG. 10D. These tables may be examples of first level parent data structures 754.

At block 830, method 800 identifies a plurality of matching pointers in the child data structure 752. In one embodiment, data store interface module 715 scans the child data structure 752, such as booking table 1052. The child scan may be done using a filter requested by the user (e.g., a set of hotels and range of dates), or some other filter. using, for example, When method 800 loops back around, and the parent data structures become the effective child (i.e., to resolve pointers to second level parents), data store interface module 715 may use the $in bulk query operation or some other "range scan" operator to retrieve parents efficiently by their primary key. The scan identifies the unique pointers in booking table 1052. Certain entries may share the same pointer to a location in a first level parent data structure 754. Since these pointers point to the same location, they can be said to have a relationship because resolving them will return the same value from the parent data structure, and it may not be necessary to resolve them all individually. In one embodiment, data store interface module 715 identifies sets of one or more unique matching pointers, so that pointers having the relationship discussed above may be resolved together. In one embodiment, one individual pointer from the set of matching pointers may be resolved on behalf of all pointers that share the relationship. For example, entries 001 and 003 in booking table 1052 both share a pointer to property identifier value 102. In one embodiment, this pointer need only be resolved once, and the retrieved value is copied into a corresponding location for each entry. Thus, one relationship class may be resolved at a time, in practice this can result in resolving many individual pointers at once.

At block 840, method 800 queries one or more first level parent data structures 754 to resolve the matching pointers in the child data structure 752. In one embodiment, data store interface module 715 identifies the first level parent data structure(s) 754 associated with the matching pointers. In the example used above, the matching pointers 102 in booking table 1052 point to property table 1054. Data store interface module 715 may send a query to property table 1054 in the NoSQL database requesting the value stored at the location associated with the pointer 102. In this example, the property value associated with property identifier 102 is the property name "Marriott." In one embodiment, method 800 may resolve multiple pointers at once (i.e., in a single round trip to the NoSQL database. For example, data store interface module 715 may send a query to property table 1054 that requests the values at the locations associated with pointers 102 and 103. Thus, the returned properly values may include "Marriott" and "Westin," respectively. In practice, a much larger number of pointers may be included in a single query to the parent table in the database. This allows many pointers to parent tables to be resolved at the same time.

At block 850, method 800 receives travel data objects from the first level parent data structures 754 that satisfy the query. In response to the query, data store interface module 715 receives the property names "Marriott," "Westin," and any other relevant property names, from property table 1054.

At block 860, method 800 copies the received travel data objects into join data structure 758. In one embodiment, join module 720 creates an ephemeral join data structure 758 in memory available to breadth-first join module 117. Join module 720 may insert a deferred pointer (also referred to as a "DimWrapper") into the fields in the join data structure 758 associated with the pointer. In response to receiving the data object value from the first level parent data structure 754, join module 720 may copy the data object value into a field in join data structure 758 associated with the pointer. One example of join data structure 758 is join table 1064 shown in FIG. 10G. Join table 1064 may be stored in memory at the application tier, rather than in the NoSQL database itself. In one embodiment, the fields associated with the pointer (e.g., those storing the deferred pointer) are overwritten with the received data object value. In this example, the property fields for entries 001 and 003 are written with the property name "Marriott" and the property field for entry 002 is written with the property name "Westin." Once complete, join table 1064 will contain all relevant data object values without the need to reference any higher level tables. Thus, profit optimization module 116 can access join table 1064 to obtain the travel data used in the operations or tasks being performed.

At block 870, method 800 determines whether there are pointers in first level parent data structure 754 pointing to a second level parent data structure 756. In some embodiments, first level parent data structures 754, such as property table 1054 may include pointers to higher level parent data structures (i.e., second level parent data structures 756). For example, property table 1054 includes pointers to city table 1060 and country table 1062. The pointers in property table 1054 (e.g., 402, 403, 501, 502) can be resolved and copied into join table 1064 in the same manner as was described above. For example, method 800 can returns to block 830 and repeat the operations at blocks 830-860 for each set of one or more unique matching pointers in the first level parent data structure 754. In this embodiment, the first level parent data structure(s) 754 may be treated as a child data structure, while the second level parent data structure(s) 756 are treated as a first level parent.

In one embodiment, the first level parent data structure, data table 1058, includes pointers to second level parent data structures (not shown) for booking date and length of stay. The booking date in date table 1058 and the date of reservation in booking table 1052 represent a two separate dates, both of which can be used by profit optimization module 116 or other logic for data analytics purposes. The booking date in date table 1058, represented by booking date identifiers 801, 802, 803, etc., represents the date on which a reservation or booking was made for travel in the future. The date of reservation in booking table 1052, represented by date identifiers 301, 302, 303, etc., represents the date for which the reservation or booking was made. In other embodiments, this date may be referred to as the "date of arrival," the "date of travel," the "date of stay," the "transaction date," or by some other name. The pointers under the booking date identifier column in date table 1058 may point to a location in a second level parent data structure, which is not illustrated.

In one embodiment, the values for both the date of travel and the booking date are stored using a standardized timing system (e.g., Greenwich Mean Time). In other embodiments, these dates may be converted and stored into a different time value. For example, the date of travel may be converted to the time zone where the travel property is located or to some other time zone. Similarly, the booking date may be converted to the time zone where the travel property is located, to the time zone where the user was located when the booking was made, or to some other time zone.

This two-dimensional concept of date management can allow profit optimization module 116, or some other logic, to perform detailed data analysis once these dates are retrieved from the data store and the pointers resolved. For example, the logic can view booking trends for some period of time prior to the date of arrival at a particular travel property. This can be expressed either in terms of pickup (i.e., how many new bookings were received during that period for travel on a date in the future) or total (i.e., what the total number of bookings for the travel date in the future were during that period). Since both the date of travel and the booking date are captured and stored in the NoSQL database by travel sessionizer 114, they are able to be retrieved by breadth-first join module 117 and added to join table 1064. Profit optimization module 116 is able to access join table 1064 to perform whatever data analytics are requested.

The length of stay fields in date table 1058, represented by length of stay identifiers 901, 902, 903, etc., represent the length of time for which a reservation or booking was made. In one embodiment, the date field represents the first date for which the booking is made, and the length of stay field represents how long the booking will last. The pointers under the length of stay identifier column in date table 1058 may point to a location in a second level parent data structure, which is not illustrated. Breadth-first join module 117 can resolve these pointers so that the values for length of stay are stored in join table 1064. For example, if the date of arrival is Jul. 1, 2013 and the length of stay is 3 nights, it can be understood that the booking will end on Jul. 4, 2013.

In one embodiment, the length of stay values pointed to by the length of stay identifiers can be used to associate a booking with a length of stay tier. Various length of stay tiers can be used to categorize bookings or reservations based on how long a guest will be staying at the travel property. For example, a first tier may include one night, a second tier may include two to three nights, a third tier may include three to five nights, and a fourth tier may include five or more nights. These are merely examples of the length of stay for each tier and in other embodiments, there may be different and/or additional tiers. In addition, a given day can be classified based on its relation to the day of arrival and the length of stay. For example, logic can query booking data for reservations that begin on a certain day, end on a certain day, include a certain day, etc. In one embodiment, which may be referred to as FirstDayMultiply, all revenue for the total length of the stay can be applied to the first day of the booking. Thus, when a query is performed to chart the revenue on a given day, all the revenue from an entire reservation may be shown as being realized on the first day of the booking. Using the length of stay tiers, profit optimization module 116 or other logic can query reservations having approximately the same or similar lengths of stay in order to perform analytic operations.

Figure 9:
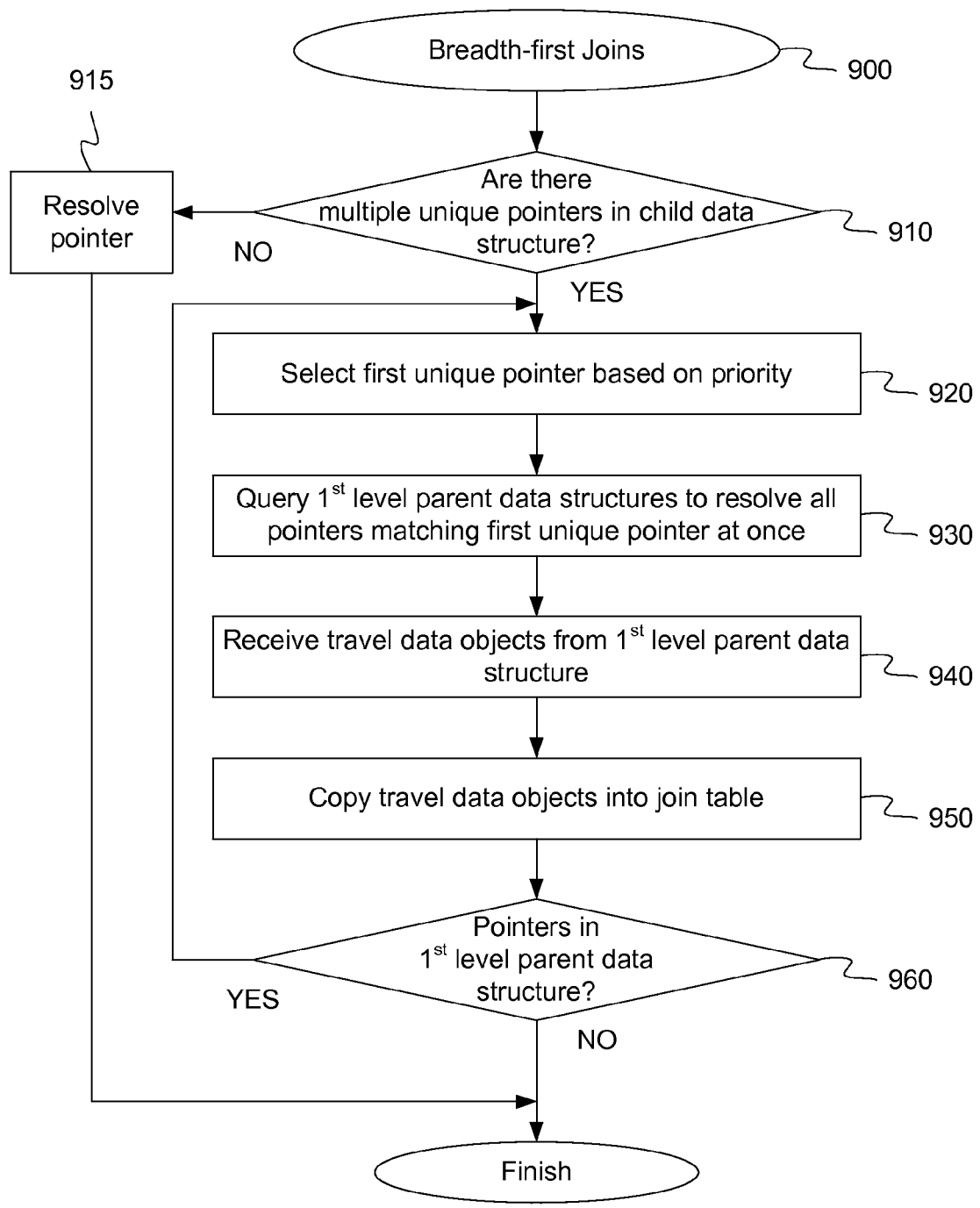
FIG. 9 is a flow diagram illustrating a method for breadth-first joins, according to an embodiment.

FIG. 9 is a flow diagram illustrating a method for breadth-first joins, according to an embodiment of the present invention. The method 900 may be performed by processing logic that comprises hardware (e.g., circuitry, dedicated logic, programmable logic, microcode, etc.), software (e.g., instructions run on a processor to perform hardware simulation), or a combination thereof. The processing logic is configured to join data from data structures in multiple levels of a hierarchical database using a breadth-first algorithm. In one embodiment, method 900 may be performed by breadth-first join module 117, as shown in FIGS. 1 and 7.

Referring to FIG. 9, at block 910, method 900 determines whether there are multiple unique pointers in child data structure 752. As discussed above, data store interface module 715 may scan the child data structure 752, such as booking table 1052. As a result of the scan, data store interface module 715 can obtain a list of all the pointers in the child data structure 752, and by performing a comparison, determine whether there are multiple unique (i.e., different) pointers.

If at block 910, method 900 determines that there are not multiple unique pointers in child data structure 752, at block 915, method 900 resolves the pointer(s). If there are not multiple unique pointers (i.e., if all of the pointers in child data structure 752 are the same), the pointers can be resolved in a conventional manner. Data store interface module 715 can query the associated first level parent data structure to retrieve the value associated with the pointer and join module 720 can copy the retrieved values into a join data structure 758, such as join table 1064.

If at block 910, method 900 determines that there are multiple unique pointers in child data structure 752, at block 920, method 900 selects a first unique pointer based on an established priority. In one embodiment, breadth-first join module 117 may include a predetermined priority for the pointers in the child data structure 752 when there are multiple distinct first level parents. For example, the pointers may be assigned a priority by a creator of the NoSQL database, by a system administrator, or by a user of an application based on the NoSQL database. In one embodiment, the priority for pointers in booking table 1052 may be the order in which the fields appear in the data structure (e.g., first property, second segment, third date, etc.). In another embodiment, the pointers may be selected for resolving in a random or pseudo-random order. In one embodiment, all of the pointers to a particular first level parent data structure 754 may be resolved at once via a bulk query of the parent, followed by all of the pointers to a next first level parent data structure, and so on. If there are not multiple distinct first level parent data structures, no priority may be needed.

At block 930, method 900 queries first level parent data structure 754 to resolve all pointers matching the first unique pointer at once. For example, data store interface module 715 may first resolve the pointers in booking table 1052 that point to property table 1054. The unique pointers under property identifier in booking table 1052 are the pointers 102 and 103. Data store interface module 715 may send a query to property table 1054 in the NoSQL database requesting the value stored at the location associated with the pointers 102 and 103. In this example, the property value associated with property identifier 102 is the property name "Marriott" and the property value associated with the property identifier 103 is the property name "Westin."

At block 940, method 900 receives travel data objects from the first level parent data structure 754. In response to the query, data store interface module 715 receives the property names "Marriott" and "Westin" from property table 1054.

At block 950, method 900 copies the received travel data objects into join table 758. In one embodiment, join module 720 creates an ephemeral join data structure 758 in memory available to breadth-first join module 117. In response to receiving the data object value from the first level parent data structure 754, join module 720 may copy the data object value into a field in join data structure 758 associated with the pointer. One example of join data structure 758 is join table 1064 shown in FIG. 10G. In this example, the property fields for entries 001 and 003 are written with the property name "Marriott" and the property fields for entry 002 is written with the property name "Westin." Once complete join table 1064 will contain all relevant data object values without the need to reference any higher level tables.

At block 960, method 900 whether there are pointers in first level parent data structure 754 pointing to a second level parent data structure 756 determines whether there are pointers in first level parent data structure 754 pointing to a second level parent data structure 756. In one embodiment, data store interface module 715 scans first level parent data structures 754 using a range scan or other similar scan to determine if there are pointers to higher level parent data structures that have not been resolved.

If there are pointers to higher level parent data structures (e.g., second level parent data structures 756), method 900 queries the higher level parent data structures 756 to resolve the remaining pointers. In some embodiments, first level parent data structures 754, such as property table 1054 may include pointers to higher level parent data structures (i.e., second level parent data structures 756). For example, property table 1054 includes pointers to city table 1060 and country table 1062. The pointers in property table 1054 (e.g., 402, 403, 501, 502) can be resolved and copied into join table 1064 in the same manner as was described above. Thus, method 900 can return to block 920 and repeat the operations at blocks 920-960 for each set of one or more unique matching pointers in the first level parent data structure 754.

Figure 11:
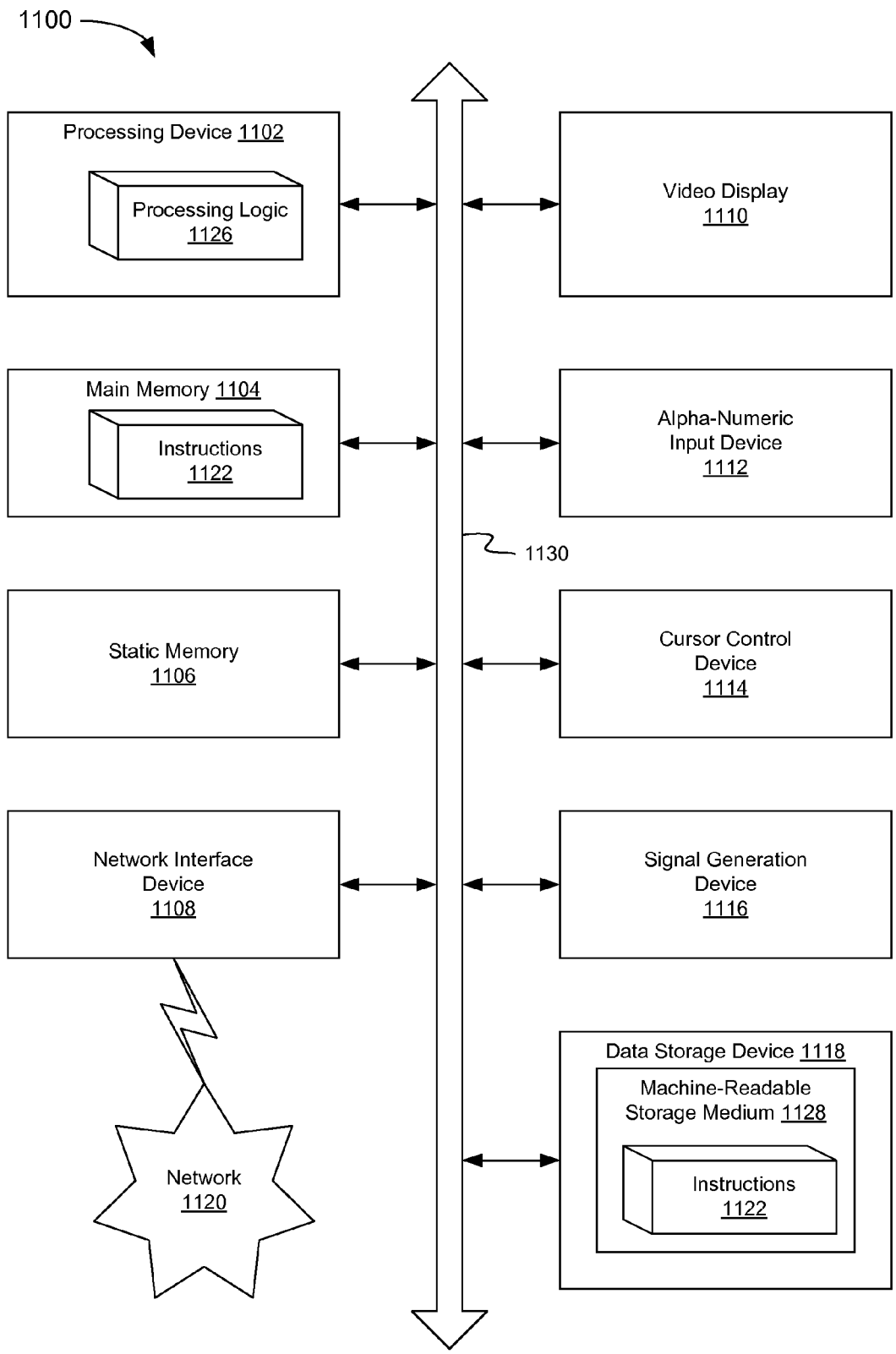
FIG. 11 is a block diagram illustrating a computer system, according to an embodiment.

FIG. 11 illustrates a diagrammatic representation of a machine in the exemplary form of a computer system 1100 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1100 may be representative of a computing device, such as user device 120, property device 130 or a computer used to support cloud 110.

The exemplary computer system 1100 includes a processing device 1102, a main memory 1104 (e.g., read-only memory (ROM), flash memory, dynamic random access memory (DRAM) (such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute processing logic 1126 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a machine-accessible storage medium 1128, on which is stored one or more set of instructions 1122 (e.g., software) embodying any one or more of the methodologies of functions described herein. The instructions 1122 may also reside, completely or at least partially, within the main memory 1104 and/or within the processing device 1102 during execution thereof by the computer system 1100; the main memory 1104 and the processing device 1102 also constituting machine-accessible storage media. The instructions 1122 may further be transmitted or received over a network 1120 via the network interface device 1108.

The machine-readable storage medium 1128 may also be used to store instructions for performing depth-first join operations on a NoSQL database, as described herein. While the machine-readable storage medium 1128 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
    receiving, at a runtime, a query for travel data, wherein the travel data is stored in a data store, the data store comprising parent and child data structures arranged in a hierarchy;
    identifying a first child data structure associated with the travel data, the first child data structure comprising a plurality of pointers, wherein each of the plurality of pointers is associated with one of a plurality of first level parent data structures in the data store;
    identifying a plurality of matching pointers in the first child data structure;
    querying, by a processing device, each of the plurality of first level parent data structures associated with the plurality of matching pointers to resolve the plurality of matching pointers in the first child data structure during a single access of the data store, wherein the plurality of first level parent data structures comprise travel data objects associated with the plurality of pointers, and wherein at least one of the plurality of first level parent data structures comprises a pointer to a second level parent data structure; and
    querying the second level parent data structure to resolve the pointer in the at least one first level parent data structure, wherein all of the plurality of pointers in the first child data structure are resolved prior to querying the second level parent data structure.

2. The method of claim 1, wherein the data store does not support join operations.

3. The method of claim 1, wherein pointers of the plurality of pointers comprise matching pointers when the pointers are associated with a same travel data object in one of the plurality of first level parent data structures.

4. The method of claim 1, further comprising:
    receiving the travel data objects associated with the plurality of pointers from the plurality of first level parent data structures; and
    copying the travel data objects into a join data structure in an application tier at locations associated with the plurality of pointers.

5. The method of claim 1, wherein each of the plurality of pointers in the first child data store is associated with a travel data object in a separate first level parent data structure.

6. The method of claim 1, wherein resolving all of the plurality of pointers in the first child data structure prior to querying the second level parent data structure comprises a breadth-first bulk join operation performed on the data store.

7. The method of claim 1, wherein the data store comprises a NoSQL database.

8. A non-transitory computer-readable storage medium storing instructions which, when executed, cause a processing device to perform operations comprising:
    receiving, at a runtime, a query for travel data, wherein the travel data is stored in a data store, the data store comprising parent and child data structures arranged in a hierarchy;
    identifying a first child data structure associated with the travel data, the first child data structure comprising a plurality of pointers, wherein each of the plurality of pointers is associated with one of a plurality of first level parent data structures in the data store;
    identifying a plurality of matching pointers in the first child data structure;
    querying, by the processing device, each of the plurality of first level parent data structures associated with the plurality of matching pointers to resolve the plurality of matching pointers in the first child data structure during a single access of the data store, wherein the plurality of first level parent data structures comprise travel data objects associated with the plurality of pointers, and wherein at least one of the plurality of first level parent data structures comprises a pointer to a second level parent data structure; and
    querying the second level parent data structure to resolve the pointer in the at least one first level parent data structure, wherein all of the plurality of pointers in the first child data structure are resolved prior to querying the second level parent data structure.

9. The non-transitory computer-readable storage medium of claim 8, wherein the data store does not support join operations.

10. The non-transitory computer-readable storage medium of claim 8, wherein pointers of the plurality of pointers comprise matching pointers when the pointers are associated with a same travel data object in one of the plurality of first level parent data structures.

11. The non-transitory computer-readable storage medium of claim 8, the operations further comprising:
    receiving the travel data objects associated with the plurality of pointers from the plurality of first level parent data structures; and
    copying the travel data objects into a join data structure in an application tier at locations associated with the plurality of pointers.

12. The non-transitory computer-readable storage medium of claim 8, wherein each of the plurality of pointers in the first child data store is associated with a travel data object in a separate first level parent data structure.

13. The non-transitory computer-readable storage medium of claim 8, wherein resolving all of the plurality of pointers in the first child data structure prior to querying the second level parent data structure comprises a breadth-first bulk join operation performed on the data store.

14. The non-transitory computer-readable storage medium of claim 8, wherein the data store comprises a NoSQL database.

15. A system comprising:
a processing device;
a memory coupled to the processing device, the memory to store a breadth-first join module, executable by the processing device from the memory, the breadth-first join module to:
query, by the processing device, each of a plurality of first level parent data structures in a hierarchical data store to resolve a plurality of matching pointers in a first child data structure during a single access of the hierarchical data store, wherein the plurality of first level parent data structures comprise travel data objects associated with the plurality of pointers, the travel data objects comprising values representing a date for which a travel booking was made, and wherein at least one of the plurality of first level parent data structures comprises a pointer to a second level parent data structure; and
query the second level parent data structure to resolve the pointer in the at least one first level parent data structure, wherein the second level parent data structure comprises values representing a date on which the travel booking was made, wherein all of the plurality of pointers in the first child data structure are resolved prior to querying the second level parent data structure.

16. The system of claim 15, wherein the breadth-first join module further to:
determine a pickup value for the date for which the travel booking was made, the pickup value comprising a number of additional bookings made for the date on a plurality of dates prior to the date for which the travel booking was made.

17. The system of claim 15, wherein pointers of the plurality of pointers comprise matching pointers when the pointers are associated with a same date for which the travel booking was made in one of the plurality of first level parent data structures.

18. The system of claim 17, wherein the breadth-first join module further to:
receive the values representing the date for which the travel booking was made associated with the plurality of pointers from the plurality of first level parent data structures; and
copy the values representing the date for which the travel booking was made into a join data structure at locations associated with the plurality of pointers.

19. The system of claim 15, wherein the second level parent data structure further comprises values representing a length of stay associated with the travel booking.

20. The system of claim 15, wherein the breadth-first join module further to:
determine a number of days associated with the travel booking; and
aggregate expected revenue associated with the travel booking according to at least one of only a first day of the travel booking, all days of the travel booking, or first day multiply, wherein for first day multiply, revenue for all days of the travel booking is applied to the first day of the travel booking.

* * * * *